3,476,778
GAMMA-PYRONE SYNTHESIS
Alfred A. Schleppnik, St. Louis, and Marvin L. Oftedahl, Crestwood, Mo., assignors to Monsanto Company, St. Louis, Mo., a corporation of Delaware
No Drawing. Filed May 16, 1966, Ser. No. 550,159
Int. Cl. C07d 7/10; C07b 25/00, 3/00
U.S. Cl. 260—345.8                12 Claims

ABSTRACT OF THE DISCLOSURE

Preparation of maltol, 2-methyl-3-hydroxy-4 - pyrone, and related compounds by (1) epoxidation of an alkenone;
(2) cyclization of epoxide product with dicarboxylic ester;
(3) dehydrogenation of cyclized product;
(4) decarboxylation.

Maltol and the related compounds are useful as flavor enhancers for food products.

---

The present invention relates to the preparation of gamma-pyrone compounds, some of which are new compounds, and particularly provides a new totally synthetic process for preparing maltol and related compounds.

Maltol, 2-methyl-3-hydroxy-4-pyrone, is well known for its usefulness as a flavor enhancer in food products such as breads, cakes, pies, candies, and various beverages such as coffee. It is also used as an ingredient in perfumes and essences.

Maltol has until recently been obtained chiefly by extraction from natural products such as certain types of wood, using destructive distillation techniques. The supply of such natural materials is rather limited so other methods of preparing maltol and related compounds are being sought by those in the chemical arts.

Recently, maltol has been made synthetically by starting with kojic acid, 2-hydroxymethyl-5-hydroxy-4-pyrone. However, kojic acid itself is obtained as a product of a fermentation process. Those in the art are seeking new and different methods of making maltol and related compounds by a totally synthetic chemical process so that it is not necessary to rely upon the availability of kojic acid in fermentation media and so that it becomes unnecessary to extract or isolate starting material chemicals from fermentation media.

It is an object of this invention to provide a totally synthetic method of preparing maltol.

A more specific object is to provide a synthetic process for preparing maltol and some new compounds related to maltol free from contamination by impurities found in maltol made by destructive distillation methods.

An additional object is to prepare new and useful gamma-pyrone compounds among which are 2-methyl-3-hydroxy-6-carbomethoxy-4-pyrone, 2-methyl-3-hydroxy-6-carboethoxy-2,3-dihydro-4-pyrone, and 2 - methyl-3-hydroxy-6-carboethoxy-4-pyrone.

These and other objects, aspects and advantages of this invention are satisfied according to this invention as described hereinbelow.

Briefly, this invention provides a process for preparing maltol and related compounds by a totally synthetic chemical process in essentially four steps from commercially available chemicals. Along the way to the desired maltol type final products this invention also provides new and valuable intermediates. The following sequence of reactions to be detailed hereinafter illustrate the new method of preparing maltol, and the new intermediate chemicals.

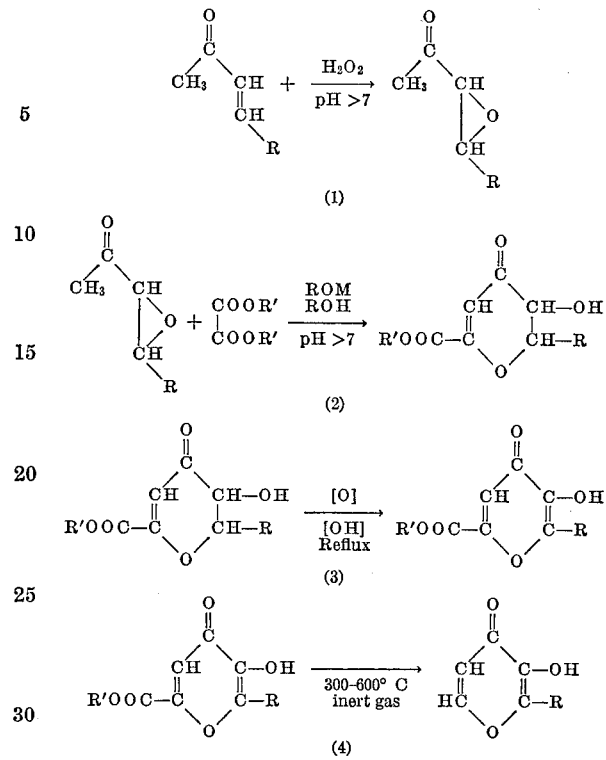

where R is an alkyl group having from 1 to 4 carbon atoms, and each R' is either alkyl having from 1 to 4 carbon atoms, phenyl, or tolyl. Preferably both R' radicals are the same, and are alkyl having from 1 to 4 carbon atoms.

A specific embodiment of the above generalized process is to (1) react 3-penten-2-one with hydrogen peroxide at a pH of at last about 7, preferably about 10 to 12, at a temperature below about 80° C. to form 3,4-epoxy-2-pentanone; (2) react the 3,4-epoxy-2-pentanone with diethyl oxalate in an alcoholic medium at a pH of at least about 7 and at a temperature of from about −10° C. to about 50° C. to form an isomeric mixture of cis- and trans-2-methyl-3-hydroxy - 6 - carboethoxy - 2,3 - dihydro - 4-pyrone; (3) treat this isomeric pyrone mixture with air or other free oxygen containing gas in a protic liquid medium at a temperature of from about 20° C. to about 120° C., preferably above 60° C., to form 6-carboethoxymaltol; and then to heat the 6-carboethoxymaltol in an inert gaseous medium to from about 300° C., to about 600° C., preferably from about 450° C. to about 550° C. to form maltol.

The 3-alken-2-one compounds which are used as starting materials in the process of this invention are obtained by reacting a lower alkanone with a lower alkanecarboxaldehyde. Useful alkanones include acetone, methyl ethyl ketone, diethyl ketone, ethyl propyl ketone, and dipropyl ketone. Suitable aldehydes include formaldehyde, acetaldehyde, propionaldehyde, n-butanaldehyde and isobutyraldehyde. For example, the use of 3-hexen-2-one from acetone and propionaldehyde lead to the formation of ethylmaltol by this process. The ene-one compounds made from these chemicals can be prepared by crossed aldol condensation with acid catalyzed dehydration of the resulting keto-alcohols, according to conventional methods.

Some of these 3-alken-2-ones are available commercially but are usually contaminated with up to about 10 percent or so of self-condensation products such as mesityl oxide. One of the advantages of the process of this invention in the first step is that we have found a method for selectively epoxidizing the 3-alken-2-one compounds from mixtures with mesityl oxide by using hydrogen peroxide in a basic medium to react with the 3-alken-2-one to form the desired 3,4-epoxy-2-alkanone.

In step (1) of the process hydrogen peroxide is preferably added to an aqueous medium containing the desired 3-alken-2-one, although the two reactants may be added simultaneously, so long as a slight molar excess of the 3-alken-2-one is present. We desire this to avoid side-reaction oxidations by excess hydrogen peroxide. The reaction medium should have a basic pH, preferably above about pH 10, by the addition of a base to the reaction medium. It is preferred to add an aqueous alkali solution such as aqueous 50 percent sodium hydroxide or potassium hydroxide, and the like after a substantial portion of the hydrogen peroxide has been added to the 3-alken-2-one solution. Reaction is noticeable as soon as the alkali solution is added. When the reaction begins, care should be taken to keep the temperature below about 80° C. in the liquid phase, but above about $-20°$ C., preferably below about 50° C., but the optimum reaction temperature will vary depending upon the 3-alken-2-one being used. With 3-penten-2-one, used in the process to make maltol, the temperature is preferably kept between about 20° C. and 35° C. by cooling as needed during the hydrogen peroxide and aqueous alkali addition times. The reaction mixture may be held for a time to insure complete reaction. A slight excess of the 3-alken-2-one is present during this time to insure complete reaction of the hydrogen peroxide used. Separation of the 3,4-epoxy-2-alkanone of this step can be accomplished by conventional methods such as by solvent extraction with a non-water soluble hydrocarbon such as benzene, toluene, hexane, etc. The organic phase containing the 3,4-epoxy-2-alkanone can be washed, and then distilled under reduced pressure to obtain pure 3,4-epoxy-2-alken-2-one. For example, 3,4-epoxy-2-pentanone boils at 45–55° C. at 25 mm. Hg from this mixture. Yields are usually about 80 percent. An additional advantage of this process step is that no reducing agent, e.g., manganese dioxide, has to be added to destroy excess hydrogen peroxide and therefore filtration of the reaction mixture prior to work up is not necessary.

With reference to step (2) of the reaction process outlined hereinabove, the 3,4-epoxy-2-alkanone is reacted with a diester of oxalic acid in a non-aqueous medium. The reactants may be mixed alone or, as is preferred, either protic or non-protic organic liquids can be used as solvents or diluent, which can have a boiling point below about 120° C. Protic solvents are compounds which can generate a proton (H+) under the conditions of the reaction including water, alcohols, carboxylic acids, mercaptans, etc., or those compounds which accept protons like amines. Nonprotic solvents or diluents are organic compounds which will not generate a proton nor accept a proton under the conditions of the reaction, e.g., hydrocarbons, chlorinated hydrocarbons, dialkyl ethers, dialkylacrylamides, such as dimethylformamide, and dialkylsulfoxides, such as dimethylsulfoxides. Lower alkanols such as methanol, ethanol, isopropanol, or mixtures of alcohols are preferred. The reaction is conducted in the presence of a strong base to maintain the pH of the mixture above about pH 7, preferably above about pH 10. The oxalic acid diester may be any ester which will react with the 3,4-epoxy-2-alkanone to form a 4-pyrone ring. We prefer that the ester groups be either alkyl groups having from 1 to about 4 carbon atoms, phenyl, or tolyl. The temperature of the reaction mixture should be kept below about 50° C. but in a liquid state, which is usually above about $-10°$ C.; preferably the temperature is kept below about 30° C. with cooling as needed. The base used is preferably a solvent alkali metal complex such as alkali metal alkoxides, e.g., sodium methoxide, potassium ethoxide, lithium methoxide or sodium ethoxide, potassium ethoxide, potassium t-butoxide, sodium t-pentoxide, which bases can be made, e.g., by adding the metal to an anhydrous alkanol such as methanol or ethanol, or by adding anhydrous alkanol to the alkali metal hydride in benzene. "M" in Equation 2 refers to alkali metal.

The 3,4-epoxy-2-alkanone is preferably added to the alkaline solution of the oxalic acid diester at a rate to keep the reaction temperature under control. For example, in making maltol the 3,4-epoxy-2-pentanone is preferably added to the alkaline alcoholic or ethereal solution of diethyl oxalate while controlling the temperature below about 25° C. to obtain the 2-methyl-3-hydroxy - 6 - carboethoxy - 2,3 - dihydro - 4 - pyrone intermediate. Similarly dipropyl, dibutyl, diphenyl, and ditolyl esters of oxalic acid in alcoholic solution are treated with a selected 3,4-epoxy-2-alkanone of the above described type to obtain the respective 2-alkyl-3-hydroxy-6-carbo-(ester)-2,3-dihydro-4-pyrone compound, each of which can be further treated in the process of this invention to prepare alkyl homologs of maltol.

Dimethyl oxalate can also be used with these 3,4-epoxy - 2 - alkanones to form the respective 6 - carbomethoxy-2-methyl-3-hydroxy-2,3-dihydro-4-pyrone, but such esters are not preferred because we have found that a more circuitous route is required to prepare maltol therefrom. The 6-carbomethoxy ester cannot be readily deesterified according to step (4) of the process of this invention. The reason is that to undergo the step (4) heating step the compound must have a beta-hydrogen in the ester group such as exists, e.g., in the ethyl, propyl, etc. esters. But, the 2-methyl-3-hydroxy-6-carbomethoxy-2,3-dihydro-4-pyrones can be made by the process of this invention and is useful by other methods for making maltol.

The oxalate esters used in this step (2) of the process of this invention contribute to the uniqueness of this process because we have found that other acid esters such as formic acid esters, e.g., ethyl formate, and benzoic acid esters, such as ethyl benzoate are less reactive and generally give poorer yields of any of the desired 2-alkyl-3-hydroxy-6-carbo(ester) - 2,3-dihydro-4-pyrone intermediates.

With reference to step (3) of the process, the 2-alkyl-3-hydroxy-6-carbo(ester)-2,3 - dihydro-4-pyrone materials obtained from step (2) above may be isolated from the reaction mixture if desired, and then treated in accordance with step (3). If the process is so conducted the reaction mixture from step (2) is acidified with an acid such as a mineral acid, e.g., hydrochloric, sulfuric, phosphoric, nitric, or an alkanoic acid having from 1 to 10 carbon atoms, preferably in an anhydrous medium while controlling the temperature to avoid decomposition of the pyrone product. The resulting mixture is then filtered to remove inorganic salt by-products, and the filtrate containing the 2-alkyl-3-hydroxy-6-carbo(ester)-2,3-dihydro-4-pyrone made from 3,4-epoxy-2-pentanone and diethyl oxalate.

It may be preferred for some applications, however, to conduct step (3) of the process in the same reaction medium in which the 2-alkyl-3-hydroxy-6-carbo(ester)-2,3-dihydro-4-pyrone is prepared. In this step (3) these 4-pyrones are treated with air or other free oxygen containing gas by passing the gas through a solution or dispersion of the pyrone in a protic liquid medium, preferably a lower alkanol such as methanol, ethanol, isopropanol, etc., or a mixture of a hydrocarbon and a lower alkanol in which mixture the lower alkanol constitutes about one-third or more by volume, to form the 6-carbo(alkyl)maltol compounds. The temperature at which the air oxidation is conducted can vary depending upon the reaction time desired. Generally, the reaction will take place at temperatures of from about 20° C. to about 120° C. It is preferred that the temperature be maintained at about 50° C. to reflux temperature of the solution. An acidic or a basic medium may be used for the aeration. In a basic medium no catalyst is required. In preparing some compounds, it may be desirable to use a catalyst such as finely divided whole metals such as platinum, palladium, etc., in presence of sulfuric acid or p-toluenesulfonic acid to speed the oxidation. The time of air treatment will depend upon the 2,3-dihydro-4-pyrone being treated, the rate of air addition, the pH of medium employed, and the temperature of the mixture. Generally, at a steady but gentle rate of air addition, the reaction should be completed within about 10 hours. For example, in preparing a maltol intermediate, 6-carboethoxymaltol, by passing air at a rate sufficient to keep the reaction going, through a refluxing ethanolic solution of 2-methyl-3-hydroxy-6-carboethoxy-2,3-dihydro-4-pyrone using 0.6 g. of p-toluenesulfonic acid in methanol at catalyst, on a 0.3 mole scale reaction, the oxidation was essentially completed within about 6.5 hours.

With respect to step (4) which can be termed the "pyrolysis" step, the 2-alkyl-3-hydroxy-6-carbo(ester)-4-pyrone is heated to from 300° to 600° C. to decompose and remove the 6-carbo-ester group, leaving maltol. No solvent or diluent need be used. It is preferred to conduct the heating step by vaporizing or distilling the 2-alkyl-3-hydroxy-6-carbo(ester)-4-pyrone in an inert gas such as nitrogen, argon, helium, or other gas which does not react with the pyrones, and in such gaseous medium heat the pyrone to a temperature high enough to decompose and remove all of the 6-carbo(ester) group and to form the 2-alkyl-3-hydroxy-4-pyrone. Thus, in preparing maltol by this method, a 2-methyl-3-hydroxy-6-carboalkoxy-4-pyrone, preferably 2-methyl-3-hydroxy-6-carboethoxy-4-pyrone, is distilled or vaporized into a stream of nitrogen, and in this gaseous medium is carried through a hot tube, heated for example, to about 550° C. to decompose the 6-carboethoxy group and to form maltol which can be condensed and recovered. A quartz tube is a useful example of a tube for use in this step.

The pyrolysis step is believed to be unique to these 2-alkyl-3-hydroxy-6-carbo(ester)-4-pyrone materials in which the ester group contains a beta hydrogen, such as appears in the 6-carboethoxy and 6-carbopropoxy esters, as distinguished from the 6-carbomethoxy esters which are not readily pyrolyzed by this step. The 2-alkyl-3-hydroxy-6-carbomethoxy-4-pyrones may be prepared by the process of this invention, however, but their use usually requires that they be hydrolyzed to the free acid (also known as 6-methylcomenic acid) and that the free acid be heated in the presence of a solvent such as dimethyl terephthalate or any of the other solvents described, for example, in columns 11 and 12 of U.S. Patent 3,130,204.

The end products of the process of this invention including maltol, and alkyl homologs of maltol such as ethylmaltol, propylmaltol, and butylmaltol are useful as flavor enhancers for food products as described above. The new intermediate compounds of this invention are useful for preparing flavor enhancer chemicals, either directly in the process of this invention or by more circuitous routes such as was described in making maltol from the new 2-methyl-3-hydroxy-6-carbomethoxy-2,3-dihydro-4-pyrone by oxidizing to form a double bond in the 2,3-position, hydrolyzing the methyl ester, and decarboxylating the 6-methylcomenic acid in a solvent.

The various processes and the preparation of certain new compounds of this invention are illustrated by the following detailed examples.

EXAMPLE 1

This example illustrates a method for preparing the 3-alken-2-one starting materials.

A chilled solution (10° C.) of acetone (345 g., 6 moles) and 10 g. of potassium hydroxide was treated with 123 g. (2.8 moles) of acetaldehyde. The addition required 70 minutes and the temperature of the reaction mixture was —5 to 5° C. Upon completion of the addition, cooling was ceased while stirring was continued for 30 minutes. The mixture was then neutralized by saturation of the solution with gaseous carbon dioxide. The reaction mass was clarified by filtration and the filtrate freed of unreacted acetone by distillation (pot temperature maximum 140° C.). The residue was treated with 0.5 g. of toluene sulfonic acid and the resultant dark reaction mass was subjected to distillation. The fraction boiling at 80–140° (161 g.) was collected. On standing, two phases formed in the distillate. The aqueous layer was discarded (contains about 5% product and should be recycled). The organic layer was washed with concentrated sodium chloride solution and then redistilled to provide 83.6 g. of 3-penten-2-one, B.P. 120–122°. Yield, 36% of theory.

A mixture of 9000 ml. of acetone, 2760 ml. of water and 247 ml. of 0.2 N NaOH was treated with 3530 ml. of acetaldehyde. The temperature of the reaction mass was maintained at 50–55° C. The addition required 75 minutes and periodic additions of 0.2 N aqueous NaOH were necessary to maintain a pH of 8.0–9.0. A volume of 150–240 ml. of 0.2 N NaOH was employed. Upon completion of the addition, the temperature (50–55° C.) was maintained for an additional hour and the reaction mixture was then neutralized with oxalic acid (8–12 g.). Excess acetone was removed by distillation (pot temperature maximum=95–105° C.). The residue was cooled and 170 ml. of 50% aqueous sulfuric acid was added. Distillation was resumed and the ketone-water azetrope collected. When the pot temperature reached 145° C., resinification began to occur. (Recycling the aqueous phase of the distillate would circumvent the resinification problem. Yields of 90% of theory may be expected by this procedure.) The aqueous layer was separated and extracted with 3× 1000 ml. of benzene. The benzene extracts were combined with the organic phase of the distillate and the material was fractionally distilled through a 30" x 2" column packed with saddles. Two such runs provided a combined yield of 5409 g. of 3-pentene-2-one product, corresponding to a yield of 63% of theory (based upon acetaldehyde). This product contained 90% (minimum) 3-penten-2-one.

EXAMPLE 2

The procedure of Example 1 is repeated substituting methyl ethyl ketone for acetone to obtain 3-hexen-2-one which is useful in the process of this invention for making ethylmaltol.

EXAMPLE 3

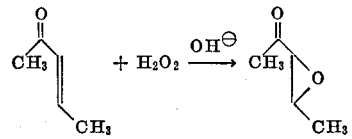

A 22 liter cooled reactor was charged with 6644 g. of 3-pentene-2-one (approximate analysis: 90% pentenone; 10% mesityl oxide) and with a solution of 210 g. of $Na_2HPO_4 \cdot 7H_2O$ in 500 g. of water. The addition of hydrogen peroxide (30% aqueous, 8920 g.) was begun at 25° C. After the addition of about 450 g. of peroxide, 80 g. of 50% aqueous sodium hydroxide solution (40 g. of NaOH) was added. The reaction started at once and the temperature of the reaction mass rose to 32° C. Cooling was applied (temperature returned to 25° C.) and peroxide addition was resumed. The peroxide addition required 5½ hours and the temperature of the batch remained at 25–32° C. during this time. The reaction mixture was held an additional 2 hours at 30° C. and then 4 liters of benzene was added and the layers were allowed to separate overnight. The benzene layer was separated and the water layer was saturated with sodium chloride, then extracted with two 3 liter portions of benzene. The benzene extracts were combined and washed with two equal portions of saturated aqueous sodium chloride solution. The benzene layer was then dried overnight over anhydrous sodium sulfate.

The benzene solution of epoxyketone was freed of solvent at reduced pressure and the product fractionally distilled to yield 6400 g. of 3,4-epoxy-2-pentanone (B.P. 45–55° at 25 mm. Hg). Yield—81% of theory. Little residue remained in the pot.

EXAMPLE 4

The procedure of Example 3 is repeated using 3-hexen-2-one in place of 3-penten-2-one to form 3,4-epoxy-2-hexanone.

EXAMPLE 5

This example illustrates the combination of steps (2) and (3).

Acylation of 3,4-epoxy-2-pentanone with diethyl oxalate, catalyzed by sodium ethoxide in benzene, base catalyzed cyclization and air oxidation.

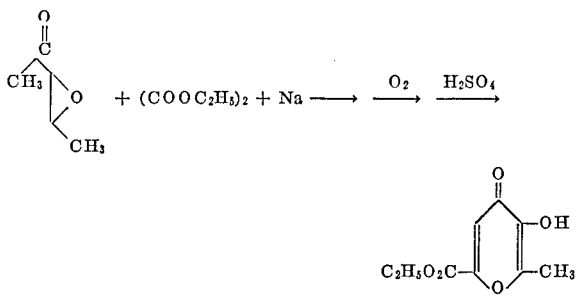

To a slurry of 7.2 g. (0.3 mole) of sodium hydride in benzene was slowly added 11.0 ml. (0.3 mole) of anhydrous ethanol. The resulting slurry of sodium ethoxide in benzene was chilled in an ice salt bath. Then 43.8 g. (0.3 mole) of ethyl oxalate were added rapidly and stirring was continued until the temperature had dropped to 5° again. 3,4-epoxy-2-pentanone (30.0 g., 0.3 mole) was added at such a rate that the temperature remained at 0–5°. A deep yellow solution formed which gradually turned to a reddish brown. Stirring was continued after completed addition for another 30 minutes and air was passed through the reaction mixture. There was no exothermic reaction. Then 100 ml. of ethanol were added and the mixture was heated to gentle reflux (pot temp. 68°) while aeration was continued (rate was such as to maintain the temperature at gentle reflux) for three hours. After acidification with hydrochloric acid, the reaction mixture was left at room temperature overnight, the inorganic material centrifuged off and the solvent was removed under reduced pressure. A crude dark gum was obtained which solidified partly after trituration with a little cold ether. A first crop of 13.5 g. of 6-carboethoxymamaltol product was isolated. The mother lqiuor was stored in the refrigerator for 24 hours and a second crop of 6.35 g. was obtained. The second mother liquor was evaporated again and the residue distilled in a short path apparatus. There was heavy decomposition and the distillate with B.P. 110–165° (air bath)/2–8 mm. was collected. The distillate crystallized almost completely and afforded, after trituration with a little ice cold ether, a third and final crop of 5.47 g. of 6-carboethoxymaltol. Total crude yield 25.59 g. (43%). Recrystallization from ethanol afforded pure product as white needles, M.P. 126°, yield 21.78 g. (36.6%).

EXAMPLE 6

Acylation of 3,4-epoxy-2-pentanone with dimethyl oxalate catalyzed by sodium methoxide; base-catalyzed cyclization and air oxidation.

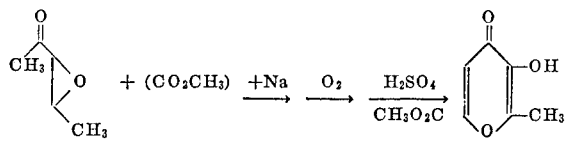

To a stirred solution of 4.6 g. (0.2 mole) of sodium in 80 ml. of anhydrous methanol at 25° C. there was added a solution of 23.6 g. (0.2 mole) of dimethyl oxalate in 20 ml. of anhydrous methanol. After 30 minutes, 20.0 g. (0.2 mole) of 3,4-epoxy-2-pentanone was rapidly added to the basic oxalate mixture while the temperature was held at 25° C. (cooling required). After 15 minutes, a yellow-brown solution was formed which was stirred another 30 minutes. Dry air was then passed through the reaction mixture, whereupon an exothermic reaction set in which was allowed to proceed freely. The temperature of the reaction mixture rose to 50° C., within a period of 10 minutes and remained at 50° C. for about one hour, eventually dropping to 25° C. The initial yellow-brown color of the reaction mixture had discharged and a fine precipitate had formed. The mixture was acidified with 10 g. of concentrated sulfuric acid in 30 ml. of methanol and was held at room temperature in this condition for 18 hours. The precipitate was then removed by filtration, washed with a little methanol and the combined filtrates concentrated at reduced pressure. The brown residue crystallized. The crystals were collected by filtration and recrystallized from anhydrous methanol to provide 16.0 g. (43.5% yield) of pure 6-carbomethoxymaltol product, M.P. 150° C.

The mother liquors yielded an additional 3.1 g. of product to bring the total yield to 52.0% of theory.

EXAMPLE 7

Metallic sodium (2.3 g., 0.1 mole) was finely cut and covered with anhydrous ethyl ether. Air was replaced by a nitrogen blanket and with stirring a mixture of 14.6 g. (0.1 mole) of ethyl oxalate and 11.4 g. (0.1 mole) of the 3,4-epoxy-4-methyl-pentanone was added slowly. After the usual induction period, a fast exothermic reaction started which was controlled by cooling with an ice-salt bath and adjusting the rate of addition in such a way, that the temperature remained at 0° throughout the addition. A dark red solution (similar to the enolate solution in oxalylations of pent-3-ene-2-one) formed which, after all sodium had been dissolved, was acidified with a solution of sulfuric acid in ether to a pH of about 1. The inorganic salts formed were filtered off and washed with ether and the combined ether solutions were evaporated on the steam bath and finally all volatile material was removed under reduced pressure. An amount of 18.3 g. (85.5%) of 2,2-dimethyl-3-hydroxy-6-carboethoxy-2,3-dihydro-4-pyrone as a brown liquid was obtained which gave an IR-spectrum typical for a dihydropyrone. It had bands at 1718 cm.$^{-1}$ (ester carbonyl), 1664 cm.$^{-1}$ (conjugated carbonyl), 1618 cm.$^{-1}$ (enol ether), 1587 cm.$^{-1}$ (conjugated double bond) and a shoulder at 1565 cm.$^{-2}$ (chelated carbonyl). The crude material was left overnight in a freezer, no crystalline material was deposited.

8.0 g. of this crude material were distilled through a short Vigreux column at 0.4 mm. After a small forerun (0.8 g. B.P. 50–94°) two fractions were obtained:

(1) B.P. 94–114°, greenish, $n_D^{25}$—1.4902, 4.0 g.

(2) B.P. 114–124°, yellowish, $n_D^{25}$—1.4990, 2.0 g.

The IR spectra of these fractions were almost superimpossible, the only difference was in the OH-region. Fraction 1 had a rather sharp peak at 3350 cm.$^{-1}$ whereas fraction 2 showed a broad maximum at 3250 cm.$^{-1}$.

NMR: The ethoxy group gave signals at 1.40 p.p.m. (T, J= 6 cps.) and 4.22 p.p.m. (Q, J=6 cps.). The two methyl groups in the 2-position gave a single peak at 1.40 p.p.m., H3 a singlet at 4.12 p.p.m. and H5 a singlet at 6.01 p.p.m. There was no spin-spin coupling across the ring. The signal of the proton of the hydroxyl group was a broad singlet at 6.80 p.p.m.

These data confirm that the product was 2,2-dimethyl-3-hydroxy-2,3-dihydro-4-pyrone.

EXAMPLE 8

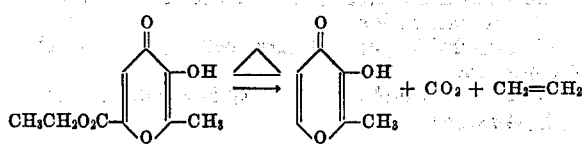 $+ CO_2 + CH_2=CH_2$

An amount of 3.0 g. of 6-carboethoxymaltol was distilled at 20 mm. Hg in a slow stream of nitrogen through an empty quartz tube heated to 550° C. The effluent stream deposited 1.46 g. of crude maltol and very little charring was noticed in the hot tube. Part of the starting material (0.31 g.) remained in the still. Sublimation of the crude maltol two times at 120° (bath)/20 mm. afforded 1.20 g. of maltol. The product has a strong odor of wood tar. The yield of crude maltol was 85.5% (corrected for unreacted starting material).

EXAMPLE 9

Following the procedure of Example 5, 3,4-epoxy-3-hexenone is reacted with diethyl oxalate to obtain 2-ethyl-3-hydroxy-6-carboethoxy-2,3-dihydro-4-pyrone, which is treated with air to obtain 2-ethyl-3-hydroxy-6-carboethoxy-4-pyrone followed by acidification and removal of solvent. Then, the 2-ethyl-3-hydroxy-6-carboethoxy-4-pyrone is vaporized into a nitrogen stream, and then heated to 500°–550° C. to decompose the carboethoxy group and form ethyl maltol

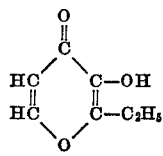

What is claimed is:

1. A process which comprises (a) treating a 3-alken-2-one having from 5 to 8 carbon atoms with hydrogen peroxide at a pH of at least about 7 at a temperature below about 80° C. to form 3,4-epoxy-2-alkanone, (b) reacting 3,4-epoxy-2-alkanone with an oxalic acid diester in which each ester group is selected from the group consisting of alkyl groups having from 1 to 4 carbon atoms, phenyl, and tolyl in a non-aqueous liquid medium at a pH of at least about 7 and at a temperature below about 50° C. to form a 2-alkyl-3-hydroxy-6-carbo(ester)-2,3-dihydro-4-pyrone where the ester is the same as the ester of the oxalic acid ester used in the process, (c) treating the 2 - alkyl - 3 - hydroxy-6-carbo(ester)-2,3-dihydro-4-pyrone with a free oxygen containing gas in a protic liquid medium at a temperature of from about 20° C. to about 120° C. to form a 2-alkyl-3-hydroxy-6-carbo(ester)-4-pyrone, and (d) heating the 2-alkyl-3-hydroxy-6-carbo(ester)-4-pyrone in an inert gas to from about 300° C. to about 600° C. to form a 2-alkyl-3-hydroxy-4-pyrone.

2. A process as described in claim 1 wherein (1) the 3-alken-2-one is 3-penten-2-one, (2) the oxalic acid diester is a dialkyl oxalate having from 1 to 4 carbon atoms in each alkyl group, (3) the oxygen containing gas is air, and (4) the heating step is conducted using nitrogen as the inert gas and a temperature of from about 450° C. to about 550° C.

3. A process as described in claim 2 wherein (1) 3-penten-2-one is reacted with hydrogen peroxide to form 3,4-epoxy-2-pentanone, (2) 3,4-epoxy-2-pentanone is reacted with diethyl oxalate to form 2-methyl-3-hydroxy-6-carboethoxy-2,3-dihydro-4-pyrone, (3) 2-methyl-3-hydroxy-6-carboethoxy-2,3-dihydro-4-pyrone is treated with air at from about 60° to about 120° to form 6-carboethoxy-maltol, and (4) 6-carboethoxymaltol is heated to from about 450° to about 550° to form maltol.

4. A process which comprises reacting a 3,4-epoxy-2-alkanone having from 5 to 8 carbon atoms with an oxalic acid diester where each ester group is selected from the group consisting of alkyl groups having from 1 to 4 carbon atoms, phenyl, and tolyl in an organic liquid medium at a pH of at least about 7 and at a temperature below about 50° C. to form a compound of the formula

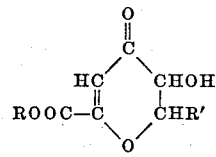

where R is selected from the group consisting of alkyl having from 1 to 4 carbon atoms, phenyl, and tolyl, and R' is an alkyl group having from 1 to 4 carbon atoms.

5. A process as described in claim 4 wherein diethyl oxalate is reacted with 3,4-epoxy pentan-2-one to form 2-methyl-3-hydroxy-6-carboethoxy-2,3-dihydro - 4 - pyrone.

6. A process which comprises treating a compound of the formula

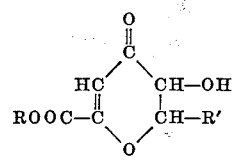

wherein R is selected from the group consisting of alkyl having from 1 to 4 carbon atoms, phenyl, and tolyl, and R' is an alkyl radical having from 1 to 4 carbon atoms with a free oxygen containing gas in an alcoholic medium at a pH of at least about 7 at a temperature of from about 60° C. to about 120° C. to form a compound of the formula

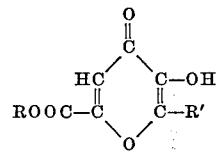

wherein R and R' are as defined above.

7. A process as described in claim 6 wherein 2-methyl-3-hydroxy-6-carboethoxy-2,3-dihydro-4-pyrone is treated with air to form 6-carboethoxymaltol.

8. A process for preparing 2-alkyl-3-hydroxy-6-carbo(ester)-4-pyrones which comprises reacting a 3,4-epoxy-2-alkanone having from 5 to 8 carbon atoms with an oxalic acid diester where each ester group is selected from the group consisting of alkyl groups having from 1 to 4 carbon atoms, phenyl and tolyl in an organic liquid medium at a pH of at least about 7 and at a temperature below about 50° C. to form a compound of the formula

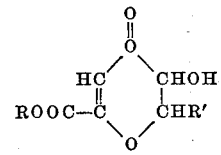

wherein R is selected from the group consisting of alkyl groups having from 1 to 4 carbon atoms, phenyl, and tolyl, and R' is an alkyl group having from 1 to 4 carbon atoms, and then treating said compound with a free oxygen containing gas in an alcoholic medium at a pH of at least about 7 at a temperature of from about 60° C. to about 120° C. to form a compound of the formula

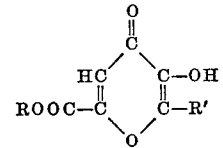

wherein R and R' are as described above.

9. A process which comprises passing a compound of the formula

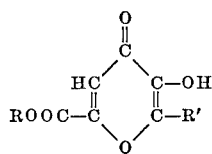

where R is selected from the group consisting of alkyl radicals having from 1 to 4 carbon atoms, phenyl and tolyl, and R' is an alkyl radical having from 1 to 4 carbon atoms into a stream of inert gas, and in such inert gas medium heating the compound to a temperature of from about 300° C. to about 600° C. to form a compound of the formula

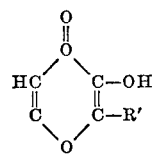

wherein R' is as defined above.

10. A process as described in claim 9 wherein 2-methyl-3-hydroxy-6-carboethoxy-4-pyrone is passed into a stream of inert gas and heated to from about 450° C. to about 550° C. to form maltol.

11. 2-methyl-3-hydroxy-6-carbomethoxy - 2,3 - dihydro-4-pyrone.

12. 2,2 - dimethyl - 3 - hydroxy-6-carboethoxy-2,3-dihydro-4-pyrone.

References Cited

UNITED STATES PATENTS

| | | | |
|---|---|---|---|
| 2,947,761 | 8/1960 | Payne | 260—348.5 |
| 3,159,652 | 12/1964 | Tate et al. | 260—345.9 |

OTHER REFERENCES

Houben-Weyl, Methoden der Organischen Chemie, vol. VI/3 (1965), pp. 396–399.

Malinovskii, M.S., "Epoxides and Their Derivatives" (1965), pp. 51 and 52.

NORMA S. MILESTONE, Primary Examiner

U.S. Cl. X.R.

260—345.9, 348.5